US005356124A

United States Patent [19]

Ai

[11] Patent Number: 5,356,124

[45] Date of Patent: Oct. 18, 1994

[54] ADJUSTABLE CLAMP FIXTURE WITH MULTI-DIRECTIONAL OPENING

[76] Inventor: Yu-Fang Ai, 3F, No. 8, Lane 261, Fu Yuan St., Taipei, Taiwan

[21] Appl. No.: 140,531

[22] Filed: Oct. 25, 1993

[51] Int. Cl.[5] .............................................. B23Q 3/08

[52] U.S. Cl. .................................... 269/134; 269/147; 269/155; 269/221; 269/287; 269/204; 269/113

[58] Field of Search ........................ 269/134, 147–149, 269/155, 228, 287, 256, 156, 219, 221, 111, 118, 119, 113, 204

[56] References Cited

U.S. PATENT DOCUMENTS

| | | | |
|---|---|---|---|
| 3,024,521 | 3/1962 | Polk | 269/219 |
| 4,552,345 | 11/1985 | Benda et al. | 269/113 |
| 4,671,500 | 6/1987 | Mark | 269/155 |
| 5,058,870 | 10/1991 | Cetnar | 269/155 |
| 5,192,060 | 3/1993 | Novak | 269/155 |

*Primary Examiner*—Robert C. Watson
*Attorney, Agent, or Firm*—Bacon & Thomas

[57] ABSTRACT

A clamp fixture with multi-directional opening comprises a front clamping head, a rear clamping base, a top and a bottom pressing plates and two latching bases. The latching bases are provided on top of the front clamping head and the rear clamping bases respectively. Each of the latching bases further comprises a bracket, a pin shaft, a thumb latch and a torsion spring. The thumb latch can be pressed down to securely position the top pressing plate, cooperating with the bottom pressing plate which feeds through the front clamping head and the rear clamping base to form a space for securely clamping the working objects with multiple panels. The operation is simple and the structure is compact.

1 Claim, 3 Drawing Sheets

ADJUSTABLE CLAMP FIXTURE WITH MULTI-DIRECTIONAL OPENING

BACKGROUND OF THE INVENTION (a) Field of the Invention

The present invention relates to a an adjustable clamp fixture with multi-directional opening, particularly to a clamp fixture having a front clamping head, a rear clamping base, a latching base to hold a top pressing plate and a bottom pressing plate together for clamping an object together for metalworking, woodworking or any other similar type of work.

(b) Description of the Prior Art

Clamp fixtures used in woodworking are generally consists of several clamps to clamp the object wood panels together. Each of the clamps can only provide the clamping to one side of the object. Therefore, several clamps have to be used together to clamp the object properly and prevent an uneven finish. This is especially true to clamp the extended size objects together. Too many clamps drive up the tooling cost and make it inconvenient to operate.

SUMMARY OF THE INVENTION

The main object according to the present invention is to provide a design for a multi-directional-opening clamp fixture which is made up of a front clamping head, a rear clamping base together with a top pressing plate and a bottom pressing plate. The front clamping head and the rear clamping base are respectively provided with a latching base so that the overall fixture is simple to operate. The fixture provides a solid grip to the left and right sides as well as the up and down sides of the work when needed. In addition, the top pressing plate is easy detachable to make the operation simple without any concern of loose grip.

A secondary object according to the present invention is to provide a design of a clamp fixture with multi-directional opening which is particularly simple and compact, which has a top pressing plate and a bottom pressing plate that are ready to be detached when they are not being used so that the clamp fixture will not occupy a lot of storage space.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
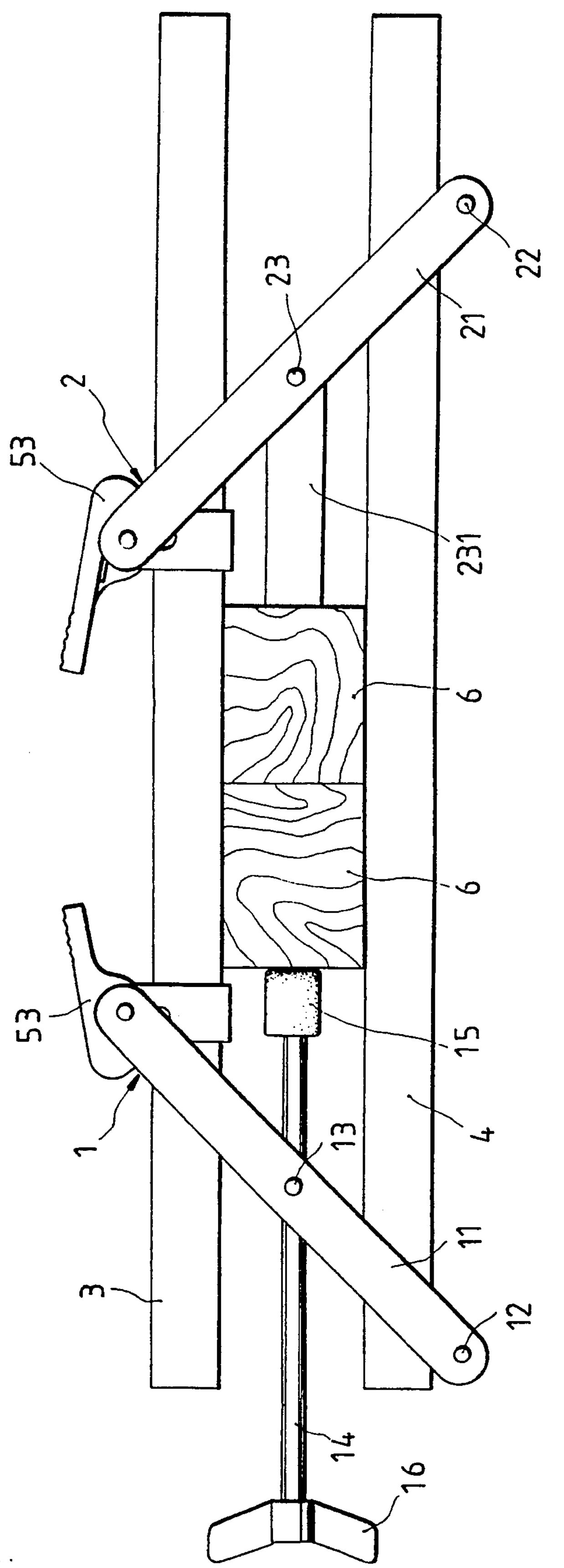
FIG. 1 shows a diagrammatic view of an embodiment of an assembly of the multi-directional clamping fixture according to the present invention.
Figure 2:
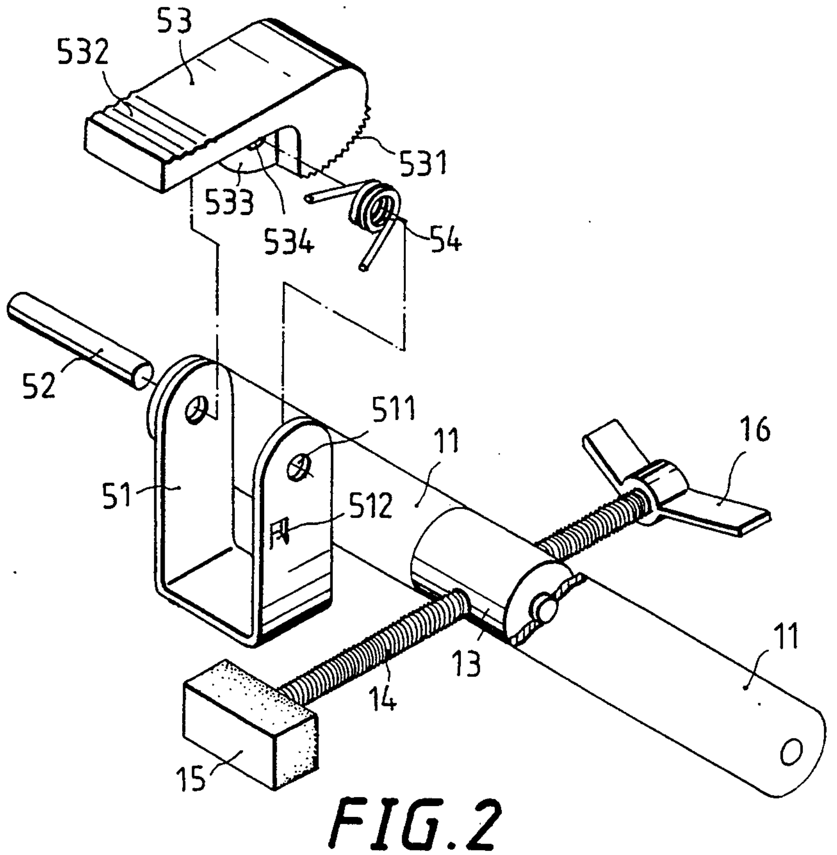
FIG. 2 is a perspective fragmented view of the front clamping head of the multi-directional clamping fixture according to the present invention.
Figure 3:
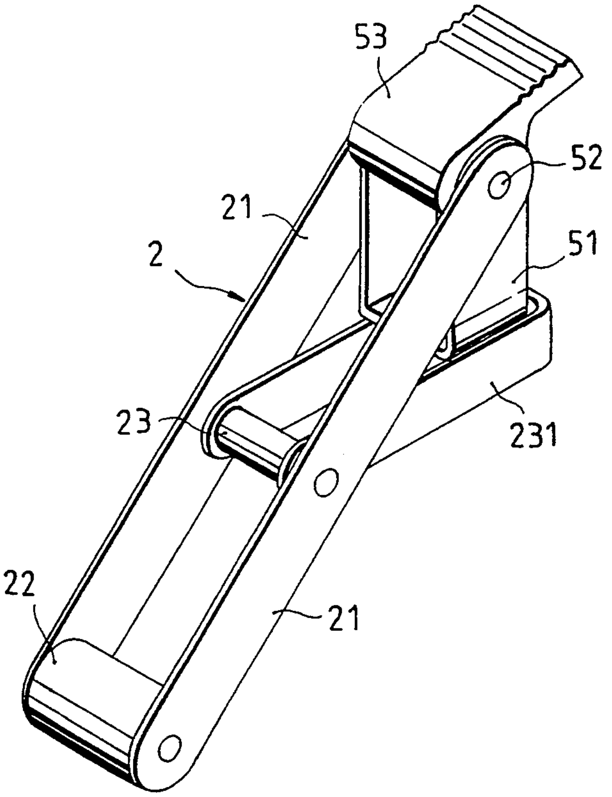
FIG. 3 is a perspective view of an assembly of the rear clamping base according to the present invention.
Figure 4:
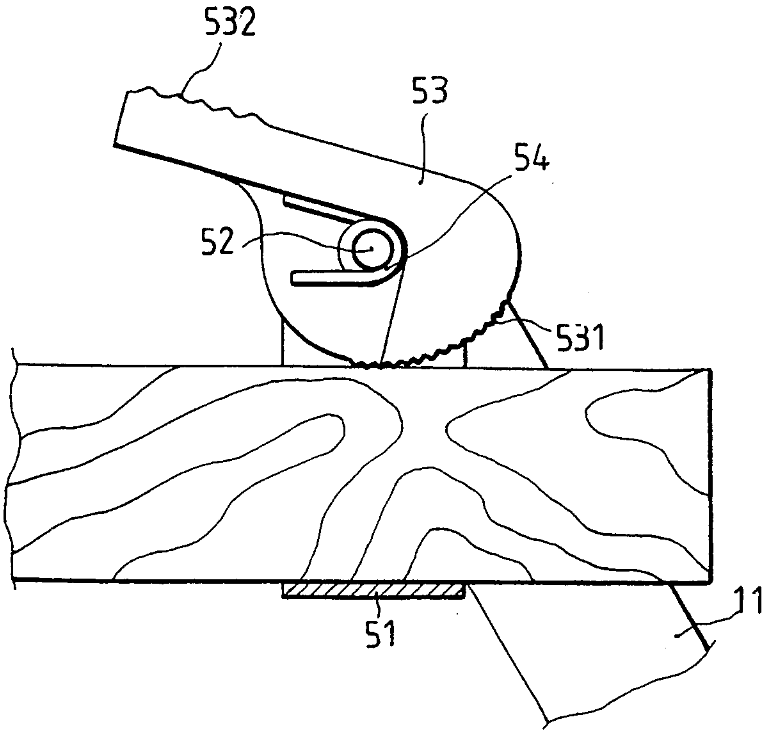
FIG. 4 is a diagrammatic view showing the locking of the latching base to the top pressing plate according to the present invention.
Figure 5:
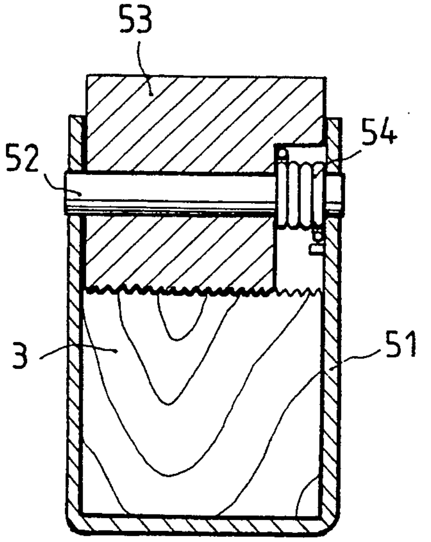
FIG. 5 is a cross-sectional view of FIG.

As shown in FIG. 1, the multi-directional clamping fixture according to the present invention mainly consists of a front clamping head 1, a rear clamping base 2, a top pressing plate 3, a bottom pressing plate 4 and two latching bases 5. The front clamping head 1 has two side plates 11 which are riveted together by a lower stud shaft 12 and a central stud shaft 13. The central stud shaft 13 is provided with a screw bolt 14, which has a pushing block 15 at its forward end and a wing nut 16 at its rearward end. The rear clamping base 2 also has two side plates 21 which coordinate with a lower stud shaft 22 and a central stud shaft 23. An inverted U-shaped blocking base 231 is inserted between the two side plates 21 and is positioned by the central stud shaft 23. The blocking base 231 is used to block and hold the objects to be clamped in place. The top pressing plate 3 is designed to have an appropriate thickness. Its width is particularly designed to fit into the front clamping head 1 and the rear clamping base 2. The overall length of the top pressing plate is designed to accommodate the width of the objects 5 to be clamped. The bottom pressing plate 4, similar to the top pressing plate 3, has an appropriate thickness. The width of the bottom pressing plate 4 is also designed to fit into the front clamping head 1 and the rear clamping base 2. The overall length of the bottom pressing plate 4 is identical to that of the top pressing plate 3. The two latching bases 5 are identical in structure. They are installed on top of the front clamping head 1 and the rear clamping base 2 respectively, as are shown in FIGS. 2 and 3.

An embodiment of the adjustable clamp fixture with multidirectional opening is now being described. Referring to FIG. 2, one of the latching bases 5 is mounted on top of the front clamping head 1. The other latching base 5 is provided on top of the rear clamping base 2, as is shown in FIG. 3. Each of the latching base 5 is made up of a bracket 51, a pin shaft 52, a thumb latch 53 and a torsion spring 54. The bracket 51 is formed to have a "U" shape with a pivotal connecting hole 511 on each side of its two side walls. A pressing plate 512 formed by punching is provided in one of the selected side walls. The pin shaft 52 is used to feed through the pivotal connecting holes 511 on each side of the bracket 51. The thumb latch 53 is of "L" shape with appropriate bending at the end. The top surface of the bending area is a corrugated surface 531. The other end of the L-shaped thumb latch is also having a corrugated top surface 532. Joining the L-shaped thumb latch 53 is a pivotal portion 533, which has a pivotal hole 534 provided thereof. The torsion spring 54 is provided immediately inside the pivotal portion 533 of the thumb latch 53. The pin shaft 52 is now used to insert through the pivotal connecting holes 511 of the bracket 51, the pivotal hole 534 of the thumb latch 53 and the torsion spring 54. One end of the torsion spring 54 is pushing against the thumb latch 53 and the other end of the torsion spring 54 is pushing against the pressing plate 512 of the bracket 51.

By the above configuration, the bracket 51 is allowed to have the top pressing plate 3 to feed through. The thumb latch 53 is pressed down appropriately to let the top pressing plate 3 to pass through and then released. Then, the corrugated surface 531 at the bending area of the L-shaped thumb latch 53 securely clamps onto the top pressing plate 3 due to the twisting force from the torsion spring 54. This setup can be used to cooperate with the bottom pressing plate 4 to securely clamp the working objects together.

This invention provides the simple means to position, to clamp and to release the top pressing plate 3. The clamping operation for the working objects is flexible, efficient, quick and convenient.

What is claimed is:

1. A multi-directional clamp fixture mainly comprising:

a front clamping head;

a rear clamping base;

a top pressing plate;

a bottom pressing plate; and pair of latching bases;

whereby said front clamping head has two side plates which are riveted together by a lower stud shaft and a central stud shaft, the central stud shaft is provided with a screw bolt, which has a pushing block at its forward end and a wing nut at its rearward end while the rear clamping base also has two side plates which cooperate with another lower stud shaft and another central stud shaft, an inverted U-shaped blocking base is inserted between the two side plates and is positioned by the central stud shaft, the blocking base is used to block and hold the working objects to be clamped in place, moreover, both the top pressing and the bottom pressing plates are designed to have appropriate thickness, the latching bases are installed on top of the front clamping head and the rear clamping base respectively, characterized in that each one of the latching bases further comprising:

bracket;

a pin shaft;

a thumb latch; and a torsion spring;

wherein the bracket is formed into "U" shape with a pivotal connecting hole on each side of its two side walls, a pressing plate formed by punching is provided in one of the selected side walls, the pin shaft is used to feed through the pivotal connecting holes on each side of the bracket, the thumb latch is of "L" shape with appropriate bending at the end, the top surface of the bending area is a corrugated surface, the other end of the L-shaped thumb latch is also having a corrugated top surface, joining the L-shaped thumb latch is a pivotal portion, which has a pivotal hole provided thereof, the torsion spring is provided immediately inside the pivotal portion of the thumb latch, the pin shaft is now used to insert through the pivotal connecting holes of the bracket, the pivotal hole of the thumb latch and the torsion spring, one end of the torsion spring is pushing against the thumb latch and the other end of the torsion spring is pushing against the pressing plate of the bracket; and by such configuration, the bracket is allowed to have the top pressing plate to feed through, the thumb latch is pressed down appropriately to let the top pressing plate to pass through and then released, then, the corrugated surface at the bending area of the L-shaped thumb latch securely clamps onto the top pressing plate due to the twisting force from the torsion spring, this setup can be used to cooperate with the bottom pressing plate to securely clamp the working objects together.

* * * * *